(12) United States Patent
Ponaka et al.

(10) Patent No.: US 12,621,267 B2
(45) Date of Patent: May 5, 2026

(54) HOSTNAME BASED REVERSE SPLIT TUNNEL WITH WILDCARD SUPPORT

(71) Applicant: Citrix Systems, Inc., Fort Lauderdale, FL (US)

(72) Inventors: Vishnu Prateek Ponaka, Bengaluru (IN); Pradeep Gaikwad, Bengaluru (IN); Jateen Mittal, Bengaluru (IN); Vinay Kumar Kothiyal, San Jose, CA (US)

( * ) Notice: Subject to any disclaimer, the term of this patent is extended or adjusted under 35 U.S.C. 154(b) by 373 days.

(21) Appl. No.: 17/850,259

(22) Filed: Jun. 27, 2022

(65) Prior Publication Data

US 2023/0421538 A1    Dec. 28, 2023

(51) Int. Cl.
H04L 9/40 (2022.01)
H04L 61/4511 (2022.01)

(52) U.S. Cl.
CPC ...... H04L 63/0272 (2013.01); H04L 61/4511 (2022.05); H04L 63/029 (2013.01)

(58) Field of Classification Search
CPC ............. H04L 63/0272; H04L 61/4511; H04L 63/029; H04L 63/0236; H04L 63/1466; H04L 63/0428; H04L 2101/345
See application file for complete search history.

(56) References Cited

U.S. PATENT DOCUMENTS

| | | | | |
|---|---|---|---|---|
| 9,819,513 B2* | 11/2017 | Lapidous | ................ | H04L 61/58 |
| 2007/0104197 A1* | 5/2007 | King | .................. | H04L 63/0263 370/392 |

| | | | | |
|---|---|---|---|---|
| 2007/0248085 A1* | 10/2007 | Volpano | .............. | H04L 63/0272 370/389 |
| 2011/0238801 A1* | 9/2011 | Bahl | ................... | H04L 61/5076 709/221 |
| 2012/0023554 A1* | 1/2012 | Murgia | ................... | H04L 63/20 726/4 |
| 2013/0163757 A1* | 6/2013 | Bellovin | ................. | H04L 63/20 380/255 |
| 2014/0344917 A1* | 11/2014 | Parla | ....................... | H04L 45/74 709/245 |
| 2015/0143505 A1* | 5/2015 | Border | ................ | H04L 63/0209 726/15 |
| 2015/0188949 A1* | 7/2015 | Mahaffey | .............. | H04W 12/37 726/1 |
| 2015/0229649 A1* | 8/2015 | Aravindakshan | ....... | H04L 67/06 709/225 |
| 2017/0251011 A1* | 8/2017 | Lapidous | .............. | H04W 12/12 |

(Continued)

FOREIGN PATENT DOCUMENTS

WO    WO-2021146311 A1 *    7/2021    .......... H04L 61/4511

*Primary Examiner* — Jimmy H Tran

(57) ABSTRACT

The present solution provides systems and methods for establishing and implementing a hostname-based split tunneling of client-side network traffic. A driver on a client can receive a first packet of an application that includes a hostname of a destination. The driver can receive from an agent of the client a real IP address and a spoofed IP address corresponding to the hostname, when the hostname matches one of a plurality of hostnames to exclude packet traffic from a VPN tunnel of the agent. The driver can receive from the agent a domain name service (DNS) response that includes the spoofed IP address and send the DNS response to cause the application to include the spoofed IP address in a second packet for the destination.

18 Claims, 11 Drawing Sheets

(56) References Cited

U.S. PATENT DOCUMENTS

| | | | | |
|---|---|---|---|---|
| 2018/0255060 A1* | 9/2018 | Bansal | H04L 67/51 |
| 2018/0309658 A1* | 10/2018 | Parla | H04L 12/4641 |
| 2018/0343238 A1* | 11/2018 | Tola | H04L 67/1095 |
| 2019/0036734 A1* | 1/2019 | Mitchell | H04L 12/4641 |
| 2019/0173839 A1* | 6/2019 | Lapidous | H04L 12/4641 |
| 2019/0334864 A1* | 10/2019 | Yin | H04L 63/0272 |
| 2021/0021564 A1* | 1/2021 | Chand | H04L 63/166 |
| 2022/0224622 A1* | 7/2022 | Kamath | H04L 69/162 |
| 2022/0224703 A1* | 7/2022 | Devarajan | H04L 45/20 |
| 2022/0368676 A1* | 11/2022 | Shribman | G06F 16/955 |
| 2023/0108854 A1* | 4/2023 | Namdev | H04L 61/2525 |
| | | | 726/15 |
| 2023/0133809 A1* | 5/2023 | Ayyadevara | H04L 63/0884 |
| | | | 709/225 |
| 2023/0254285 A1* | 8/2023 | Henson | H04L 63/0227 |
| | | | 726/13 |
| 2023/0379405 A1* | 11/2023 | Chhabra | H04L 61/2528 |
| 2024/0098061 A1* | 3/2024 | Wondra | H04L 61/2514 |
| 2024/0214363 A1* | 6/2024 | Devarajan | H04L 63/166 |
| 2024/0297868 A1* | 9/2024 | Maluf | H04L 63/0421 |
| 2025/0023940 A1* | 1/2025 | Rubenstein | H04N 21/8586 |
| 2025/0150430 A1* | 5/2025 | Chand | H04L 63/0272 |

* cited by examiner

Method 800

Receive a packet of an application  805

Receive a real IP address and a spoofed IP address  810

Receive a DNS transmission with a spoofed IP address  815

Send the DNS transmission with spoofed IP address to applicaition  820

Update a packet with a spoofed IP address  825

Update a packet with a real IP address  830

HOSTNAME BASED REVERSE SPLIT TUNNEL WITH WILDCARD SUPPORT

FIELD OF THE DISCLOSURE

The present application generally relates to computing systems and environments, including but not limited to systems and methods for managing network traffic.

BACKGROUND

Network communication is increasingly relying on cloud technologies. As users access online resources that can be provided by various remote servers and network devices, the network traffic of the users can increasingly be handled using various cloud-based products or services. Sometimes client interaction with particular services or resources on the network may involve using cloud products and services that can be handled by various aspects of network traffic delivery.

SUMMARY

This summary is provided to introduce a selection of concepts in a simplified form that are further described below in the Detailed Description. This Summary is not intended to identify key features or essential features, nor is it intended to limit the scope of the claims included herewith.

The present solution can relate to a method, such as a method for hostname based reverse split tunneling of network traffic. The method can include a driver receiving a first packet of an application that includes a hostname of a destination. The driver can receive, from an agent, a real IP address and a spoofed IP address corresponding to the hostname. The driver can receive the real IP address and the spoofed IP address when the hostname matches one of a plurality of hostnames to exclude packet traffic from a virtual private network (VPN) tunnel of the agent. The driver can receive, from the agent, a domain name service (DNS) response that includes the spoofed IP address. The driver can send the DNS response to cause the application to include the spoofed IP address in a second packet for the destination.

The method can include/involve the agent, the driver and the application executable/executing on a same client device. The method can include the driver receiving, from the application via an operating system, the second packet that includes the spoofed IP address. The driver can update the second packet by replacing the spoofed IP address with the real IP address. The driver can send the updated second packet to the destination by bypassing the VPN tunnel of the agent. The driver can receive, from an operating system, a third packet that includes the real IP address. The driver can update the third packet by replacing the real IP address with the spoofed IP address. The driver can send the updated third packet to the application via the operating system.

The driver can receive, from the application via an operating system, a third packet that includes second hostname of a second destination. The driver can receive, from the agent, a second DNS response that includes a second real IP address corresponding to the second hostname, when the second hostname fails to match any of the plurality of hostnames. The driver can send the second DNS response to cause the application to include the second real IP address corresponding to the second hostname, in a fourth packet. The driver can receive, from the application via the operating system, the fourth packet that includes the second real IP address. The driver can determine that the second real IP address does not correspond to any spoofed IP address and send, responsive to the determination, the fourth packet to the agent to send to the second destination via the VPN tunnel. The driver can receive, from the agent, an indication of spoofed IP addresses, wherein the agent configures an operating system to direct packets with any of the spoofed IP addresses to the driver.

The present solution can relate to a system, such as a system for hostname based reverse split tunneling of network traffic. The system can include a device. The device can include at least one processor configured to execute a driver. The driver can receive a first packet of an application that includes a hostname of a destination. The driver can receive, from an agent, a real IP address and a spoofed IP address corresponding to the hostname. The driver can receive the real IP address and the spoofed IP address when the hostname matches one of a plurality of hostnames to exclude packet traffic from a virtual private network (VPN) tunnel of the agent. The driver can receive, from the agent, a domain name service (DNS) response that includes the spoofed IP address. The driver can send the DNS response to cause the application to include the spoofed IP address in a second packet for the destination.

The device can include the agent, the driver and the application that are executable on the device. The device can include the least one processor configured to execute the driver to receive, from the application via an operating system, the second packet that includes the spoofed IP address and update the second packet by replacing the spoofed IP address with the real IP address. The device can include the at least one processor configured to execute the driver to send the updated second packet to the destination by bypassing the VPN tunnel of the agent.

The device can include the driver to receive, from an operating system, a third packet that includes the real IP address and update the third packet by replacing the real IP address with the spoofed IP address. The driver can send the updated third packet to the application via the operating system. The driver can receive, from the application via an operating system, a third packet that includes second hostname of a second destination. The driver can receive, from the agent, a second DNS response that includes a second real IP address corresponding to the second hostname, when the second hostname fails to match any of the plurality of hostnames. The driver can send the second DNS response to cause the application to include the second real IP address corresponding to the second hostname, in a fourth packet.

The driver can receive, from the application via the operating system, the fourth packet that includes the second real IP address. The driver can determine that the second real IP address does not correspond to any spoofed IP address. The driver can send, responsive to the determination, the fourth packet to the agent to send to the second destination via the VPN tunnel. The driver can receive, from the agent, an indication of spoofed IP addresses, wherein the agent configures an operating system to direct packets with any of the spoofed IP addresses to the driver.

The present solution can relate to a non-transitory computer-readable medium, such as a computer-readable medium storing instructions for implementation of hostname based reverse split tunneling of network traffic. A non-transitory computer-readable medium can store instructions that, when executed by at least one processor of a service, cause the at least one processor to receive a first packet of an application that includes a hostname of a destination. The instructions can cause the at least one processor to receive, from an agent, a real IP address and a spoofed IP address corresponding to the hostname, when the hostname matches one of a plurality of hostnames to exclude packet traffic from a virtual private network (VPN) tunnel of the agent. The instructions can cause the at least one processor to receive, from the agent, a domain name service (DNS) response that includes the spoofed IP address. The instructions can cause the at least one processor to send the DNS response to the application to cause the application to include the spoofed IP address in a second packet for the destination.

The instructions can cause the at least one processor to receive, from the application via an operating system, the second packet that includes the spoofed IP address. The instructions can cause the at least one processor to update the second packet by replacing the spoofed IP address with the real IP address. The instructions can cause the at least one processor to send the updated second packet to the destination by bypassing the VPN tunnel of the agent.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

Figure 3:
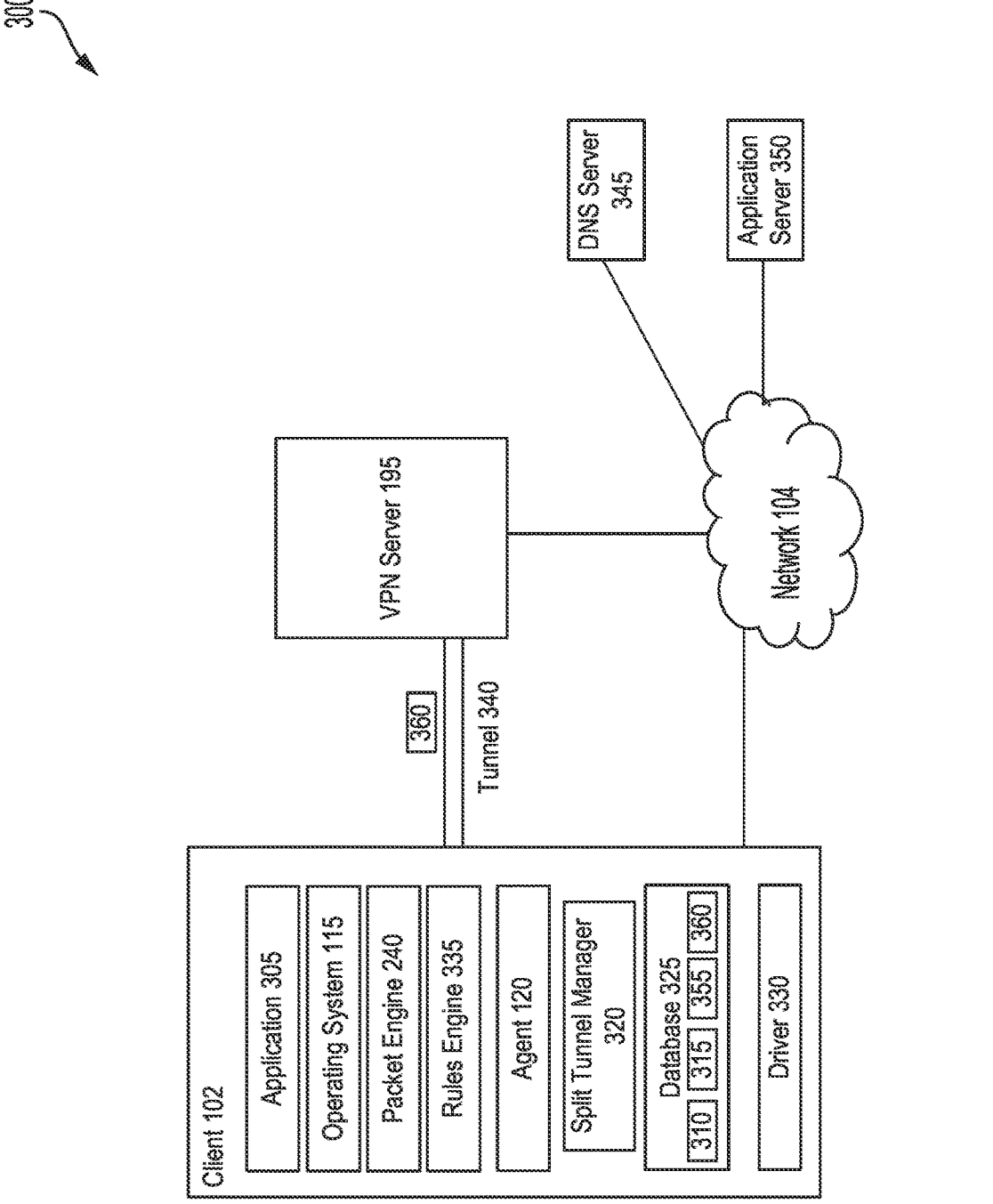
Figure 4:
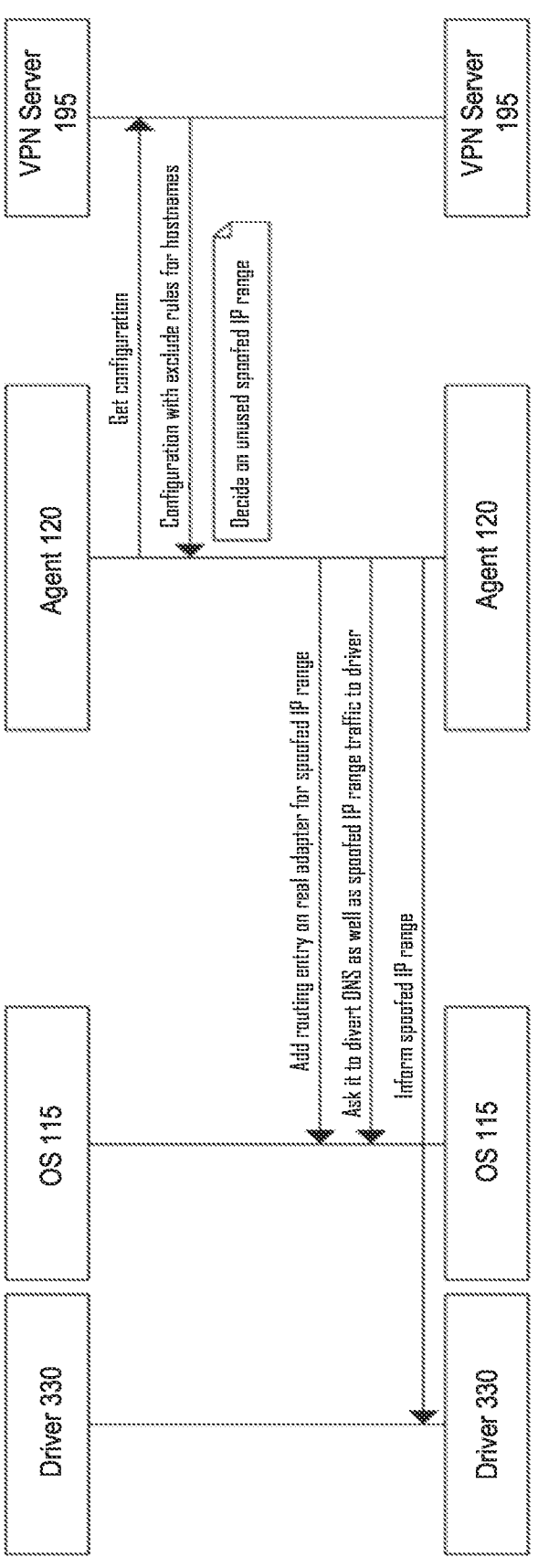
Figure 5:
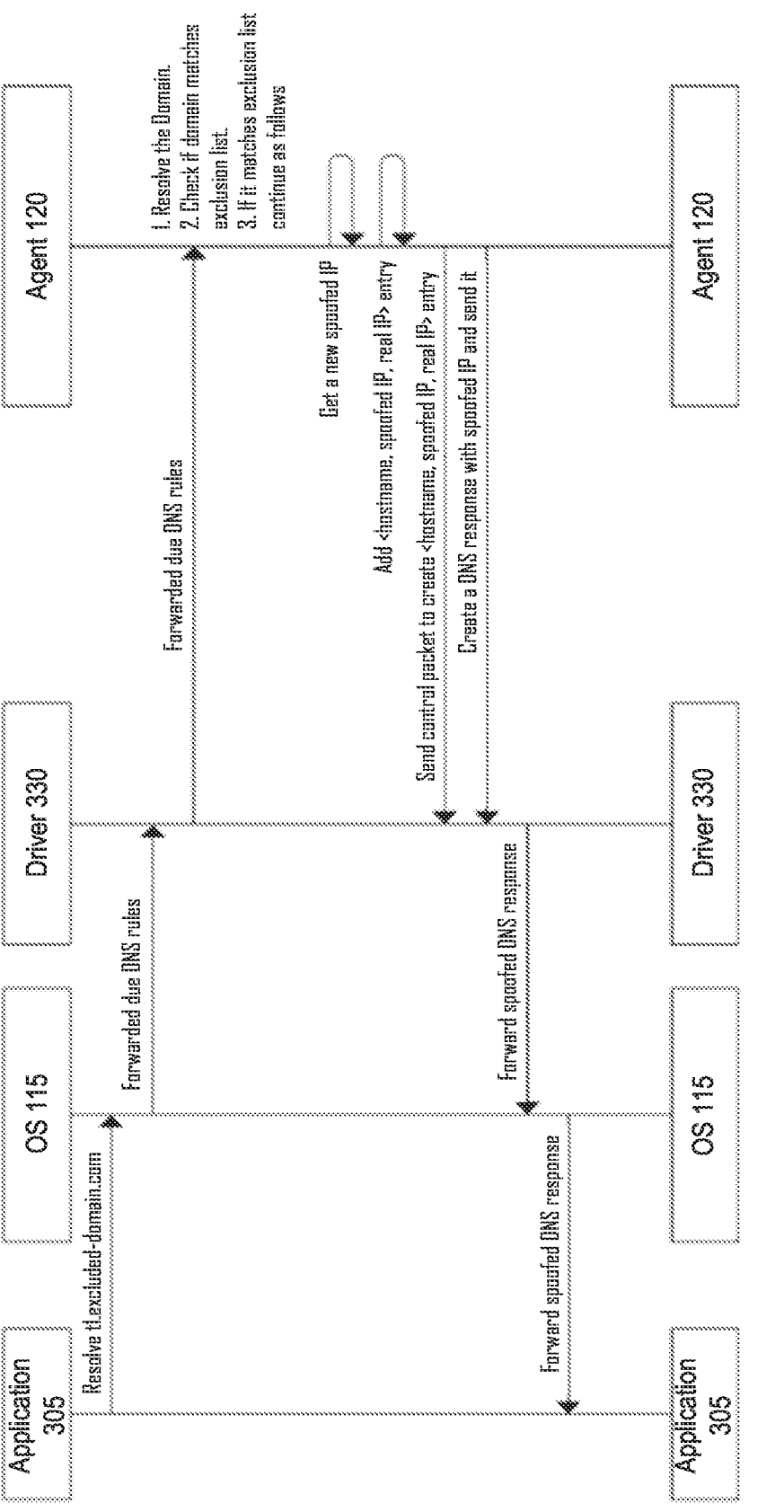
Figure 6:
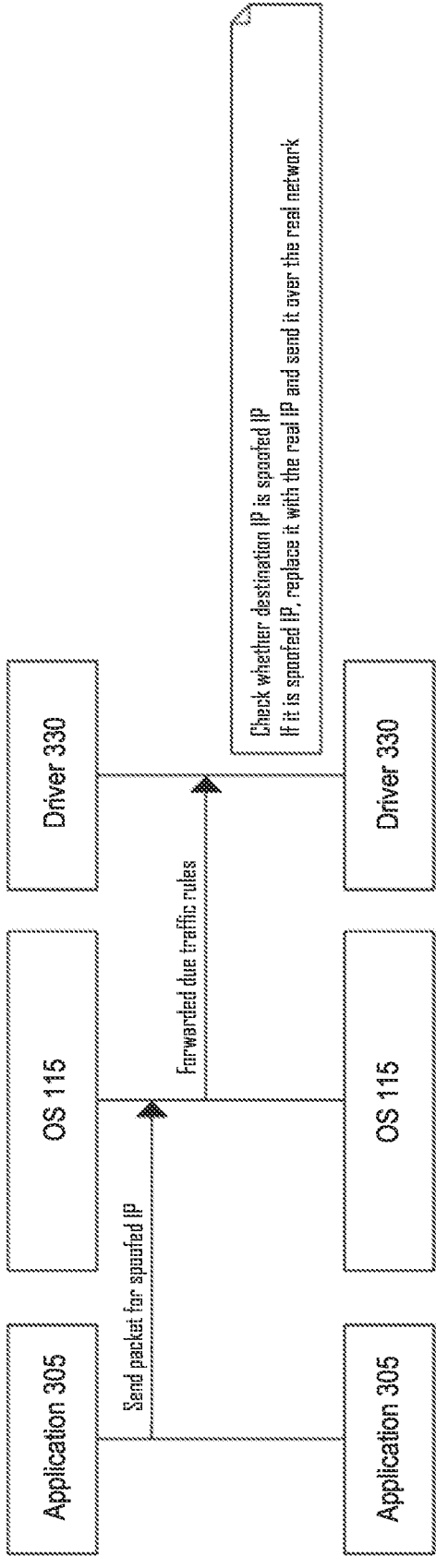
Figure 7:
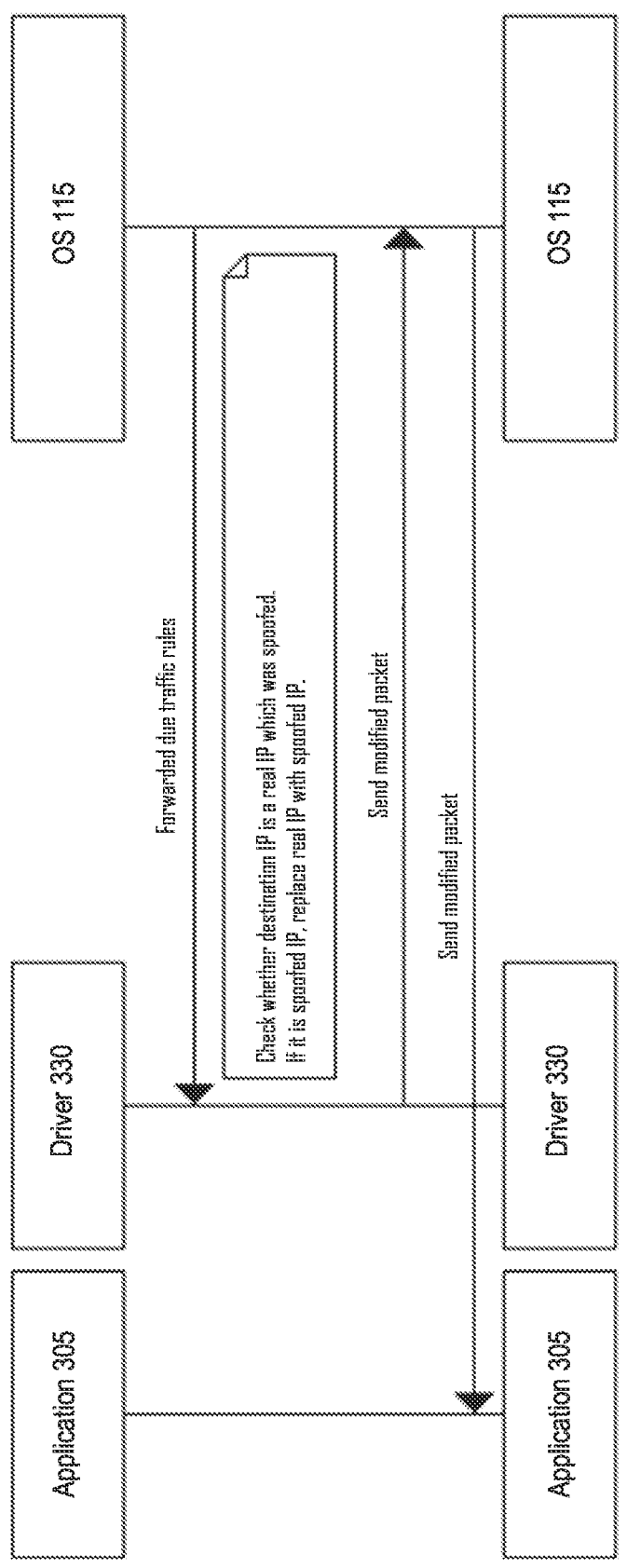
Figure 8:
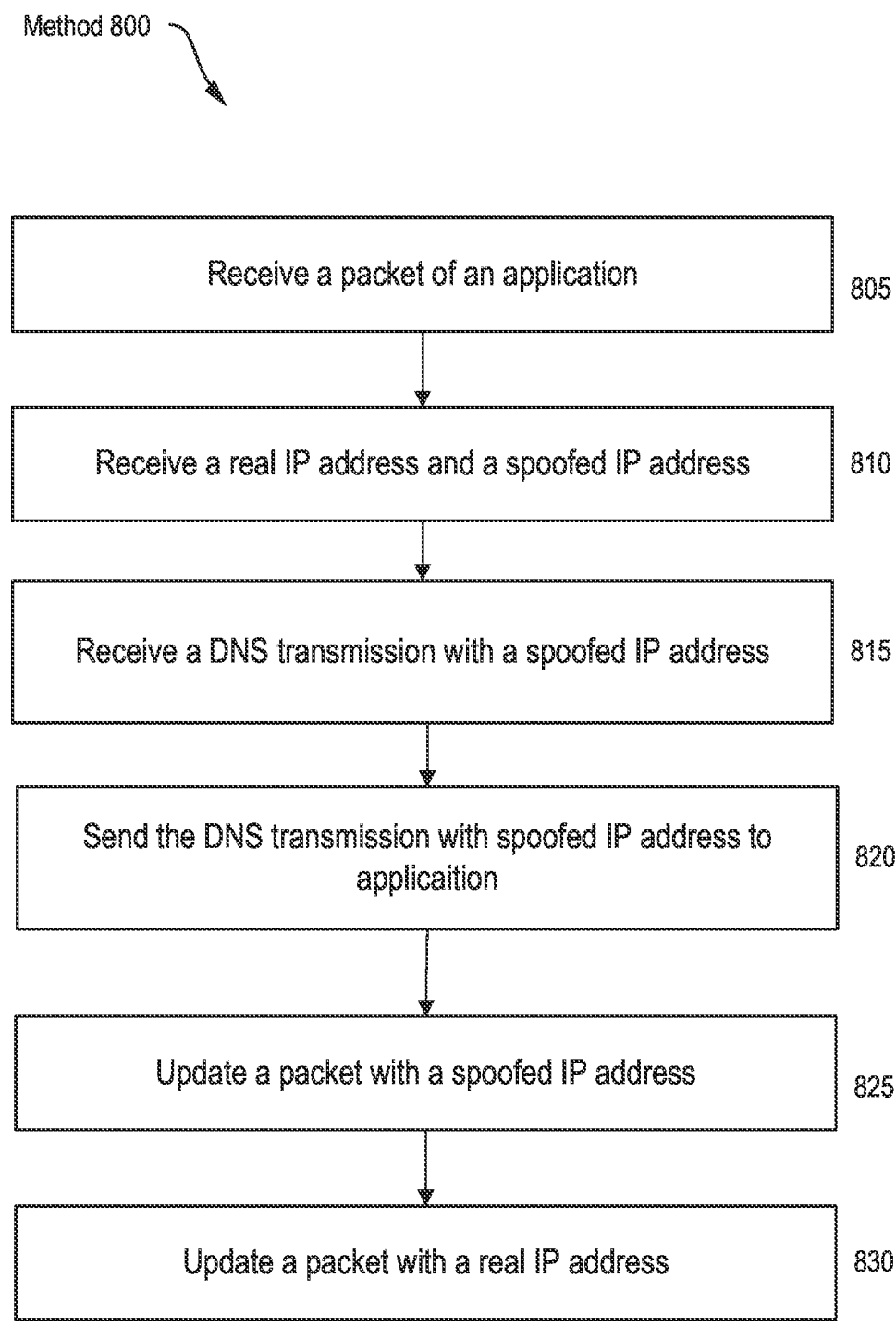

FIG. 3 includes a block diagram of an example system for establishing and implementing hostname-based split tunneling of client-side network traffic, in accordance with an illustrative embodiment;

FIG. 4 includes a flow diagram of an example of acts implemented to establish a tunnel with hostname-based split tunneling functionality for client-side network traffic, in accordance with an illustrative embodiment;

FIG. 5 includes a flow diagram of an example of acts to implement hostname resolution for a tunnel with hostname-based split tunneling functionality for client-side network traffic, in accordance with an illustrative embodiment;

FIG. 6 includes a flow diagram of an example of acts for outgoing traffic packet processing at a client implementing hostname-based split tunneling functionality for client-side network traffic, in accordance with an illustrative embodiment;

FIG. 7 includes a flow diagram of an example of acts for incoming traffic packet processing at a client implementing hostname-based split tunneling functionality for client-side network traffic, in accordance with an illustrative embodiment;

FIG. 8 is a flow diagram of an example method 800 for implementing hostname-based split tunneling functionality for client-side network traffic, in accordance with an illustrative embodiment.

DETAILED DESCRIPTION

Secure remote access products and services, such as the Citrix Gateway SSL VPN, can provide access technology that can enable secured communication between remote users and private enterprise network. Such technology can, for example, include software deployed on remote devices to capture network packets, and send those packets to virtual private network (VPN) server after encryption. A entity, such as an enterprise deploying such products or services on its network, can choose to tunnel all of its network traffic. Tunneling can involve, for example, securely transmitting data packets from one network to another, sometimes even via public networks, utilizing techniques such as encapsulation of data packets to ensure their secured delivery.

However, as tunneling can consume resources and cause delays in network traffic delivery, sometimes adversely affecting the user experience, the enterprise can choose to tunnel only a part of the network traffic that is sensitive or work-specific, while avoiding unnecessary resource consumption or delays by excluding from tunneling the data traffic that is not sensitive or not work-specific. This can be achieved using "split tunnel" functionality in which all network traffic, except the network traffic from particular selected applications, can be communicated through the secure tunnel. The entity can, for example, add reverse split tunnel rules to a rules engine which can then be used to exclude the specific network traffic from the tunneling, thereby implementing tunneling only on a subset of network traffic for which the security is actually a concern.

However, as entities are increasingly relying on cloud-based services for various network communications, IP addresses on which split tunneling implementations usually rely can become unreliable due to the fact that cloud-based services often change their IP addresses without any advance notice. This in turn can cause the split tunneling solutions to fail to remove from tunneling the network traffic relying on cloud-based external services, adding to the delay and usage of resources.

To resolve these issues, the present solution provides for systems and methods of utilizing hostname-based split tunneling in which a more reliable and less often changed hostname of a cloud-based service can be used for identifying network traffic for split tunneling purposes. The solution can utilize an agent and a driver implemented on a client device to utilize spoofed IP addresses of external cloud-based services to maintain operation of the IP-based split tunneling solution and the client-based application communicating with the cloud-based services over the network.

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for hostname based split tunneling.

A. Network and Computing Environment

Figure 1A:
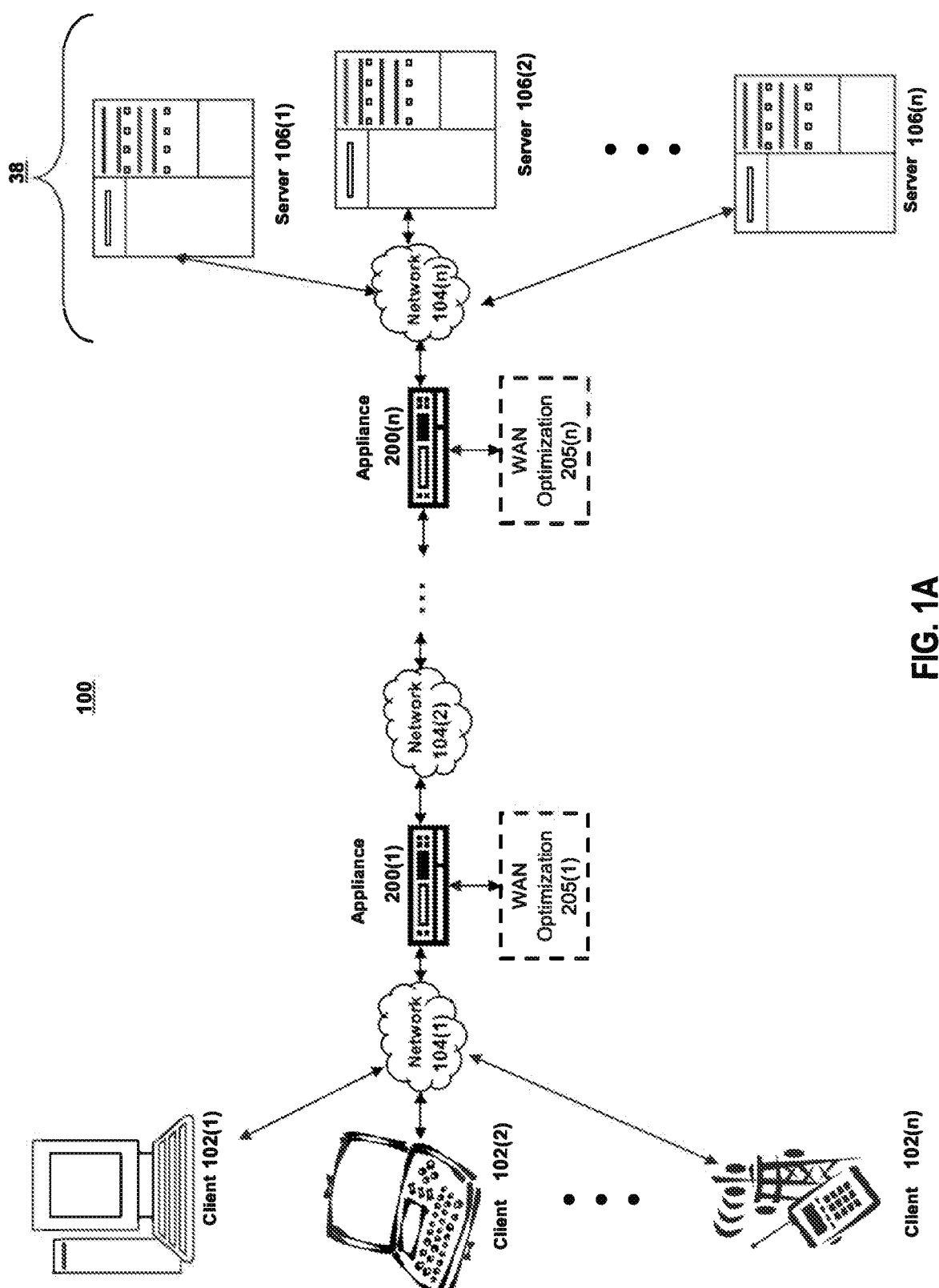
FIG. 1A is a block diagram of a network computing system, in accordance with an illustrative embodiment.

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as Citrix networking (formerly NetScaler®) products sold by Citrix Systems, Inc. of Fort Lauderdale, FL.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as Citrix SD-WAN products sold by Citrix Systems, Inc. of Fort Lauderdale, FL.

Figure 1B:
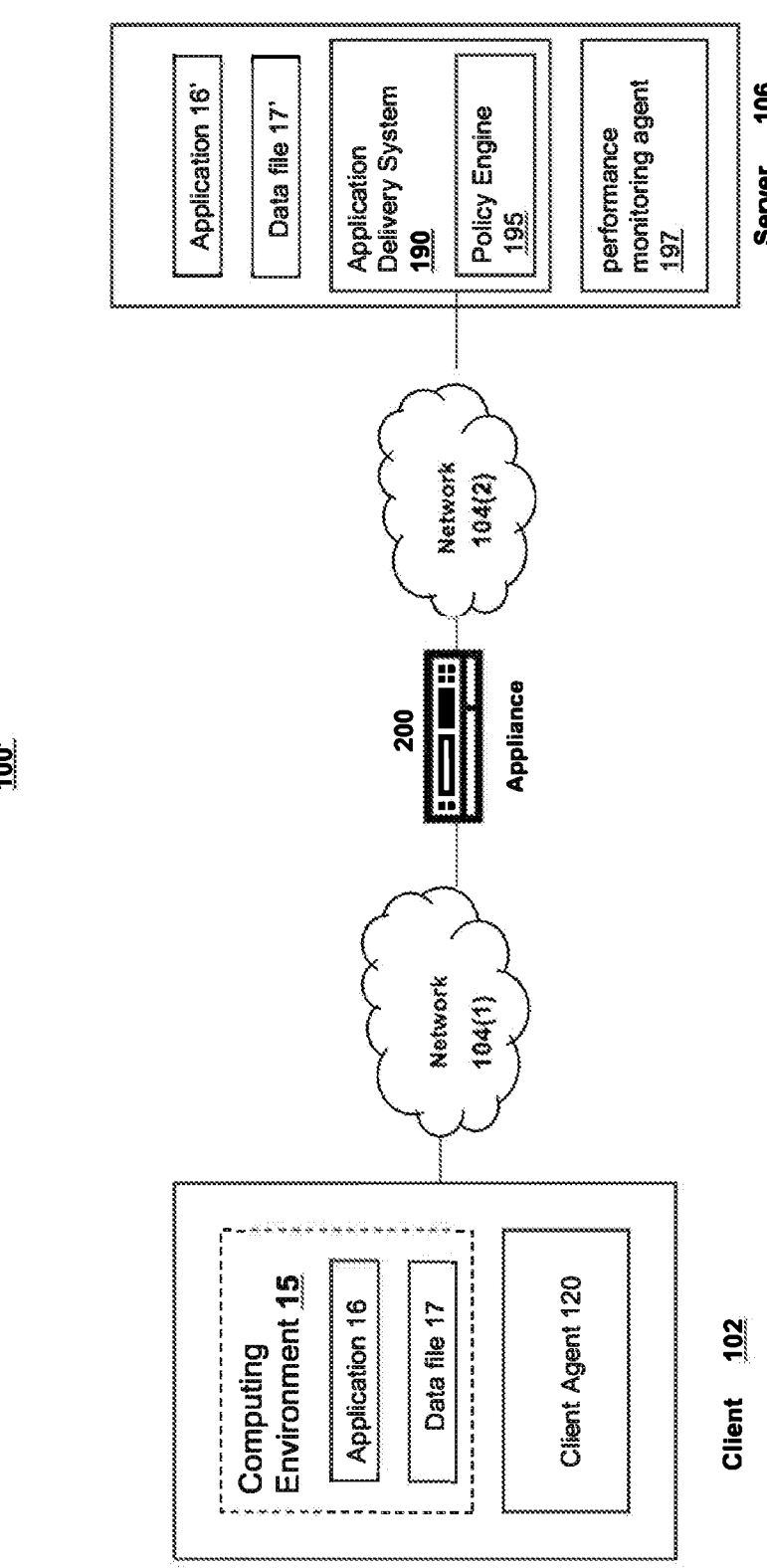
FIG. 1B is a block diagram of a network computing system for delivering a computing environment from a server to a client via an appliance, in accordance with an illustrative embodiment.

Referring to FIG. 1B, an example network environment, 100', for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17. Computing environment 15, application 16 and/or data file 17 may be delivered via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as Citrix Virtual Apps and Desktops (formerly XenApp® and XenDesktop®).

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 120 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, FL. The application may be any application related to real-time data communications, such as applications for streaming graphics, streaming video and/or audio or other data, delivery of remote desktops or workspaces or hosted services or applications, for example infrastructure as a service (IaaS), desktop as a service (DaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or an appliance 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as Citrix Analytics or Citrix Application Delivery Management by Citrix Systems, Inc. of Fort Lauderdale, FL.

The monitoring agents 120 and 197 may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
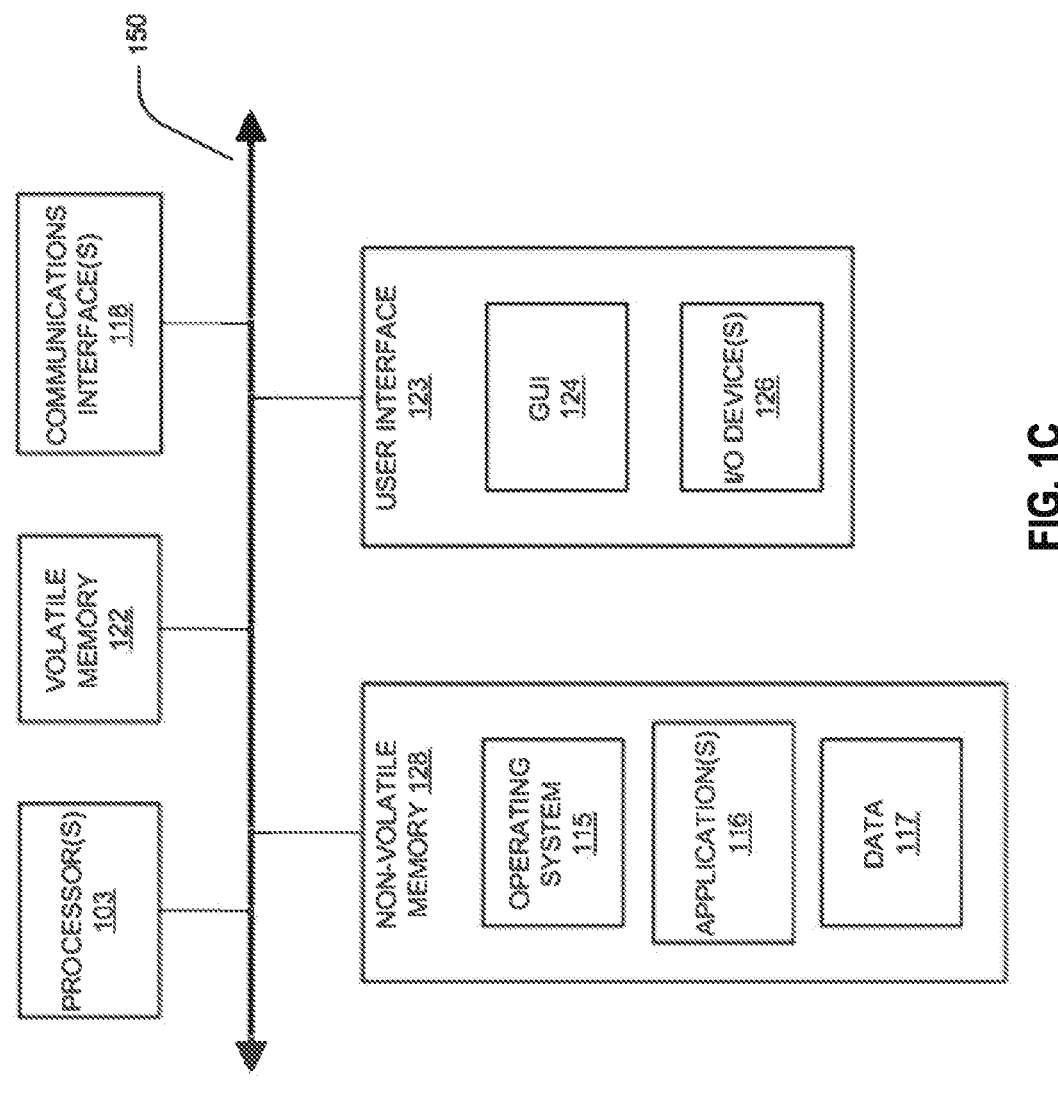
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

Additional details of the implementation and operation of network environment 100, clients 102, servers 106, and appliances 200 and 205 may be as described in U.S. Pat. No. 9,538,345, issued Jan. 3, 2017 to Citrix Systems, Inc. of Fort Lauderdale, FL, the teachings of which are hereby incorporated herein by reference.

Figure 1D:
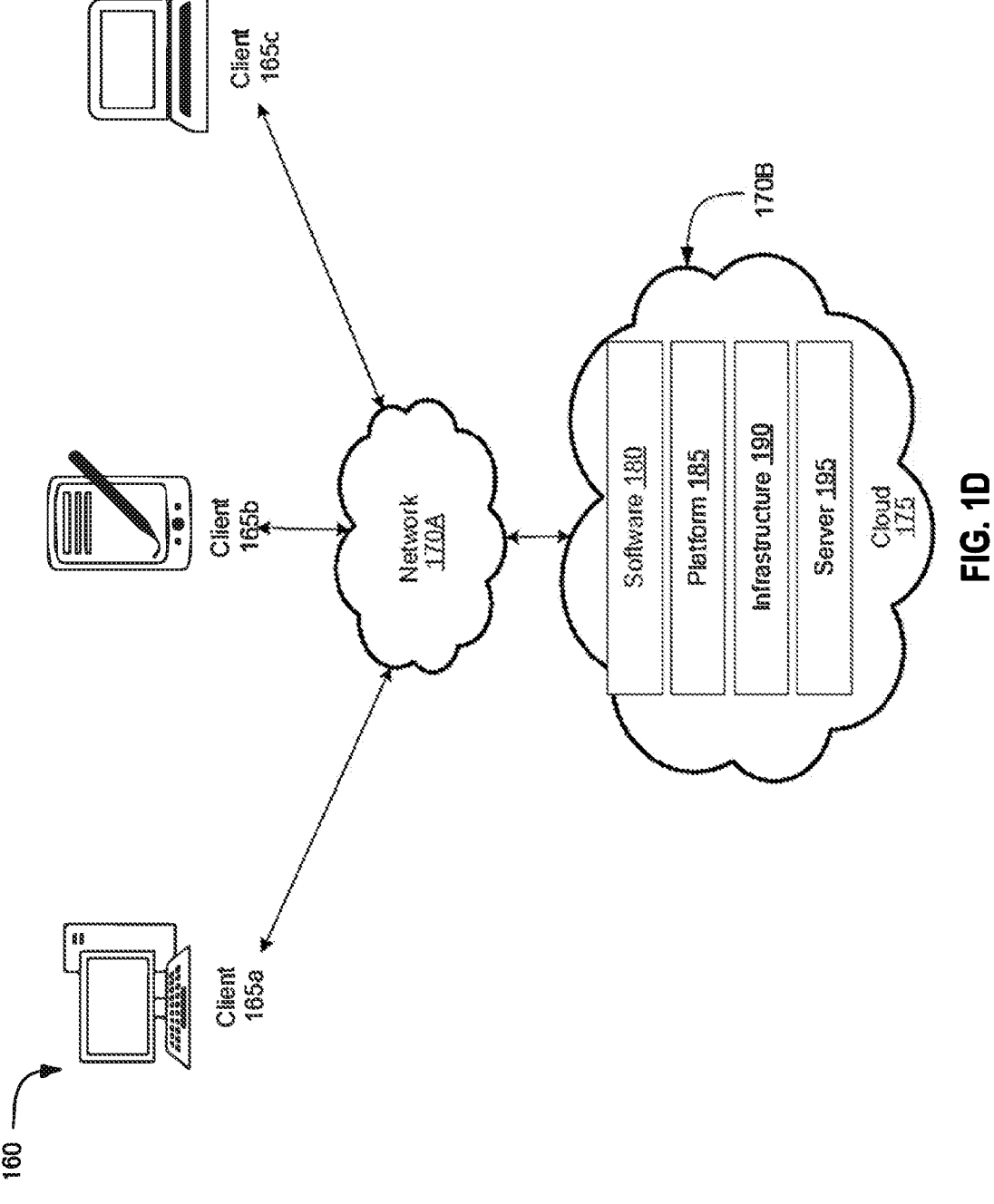
FIG. 1D is a block diagram depicting a computing environment comprising client device in communication with cloud service providers, in accordance with an illustrative embodiment.

Referring to FIG. 1D, a computing environment 160 is depicted. Computing environment 160 may generally be considered implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing or cloud network, computing environment 160 can provide the delivery of shared services (e.g., computer services) and shared resources (e.g., computer resources) to multiple users. For example, the computing environment 160 can include an environment or system for providing or delivering access to a plurality of shared services and resources to a plurality of users through the internet. The shared resources and services can include, but not limited to, networks, network bandwidth, servers 195, processing, memory, storage, applications, virtual machines, databases, software, hardware, analytics, and intelligence.

In embodiments, the computing environment 160 may provide client 165 with one or more resources provided by a network environment. The computing environment 165 may include one or more clients 165a-165n, in communication with a cloud 175 over one or more networks 170A, 170B. Clients 165 can include any functionality or features of clients 102 and vice versa. Clients 165 may include, e.g., thick clients, thin clients, and zero clients. The cloud 175 may include back end platforms, e.g., servers 195, storage, and server farms or data centers. Clients 165 can be the same as or substantially similar to computer 100 of FIG. 1C.

The users or clients 165 can correspond to a single organization or multiple organizations. For example, the computing environment 160 can include a private cloud serving a single organization (e.g., enterprise cloud). The computing environment 160 can include a community cloud or public cloud serving multiple organizations. In embodiments, the computing environment 160 can include a hybrid cloud that is a combination of a public cloud and a private cloud. For example, the cloud 175 may be public, private, or hybrid. Public clouds 175 may include public servers 195 that are maintained by third parties to clients 165 or the owners of the clients 165. The servers 195 may be located off-site in remote geographical locations as disclosed above or otherwise. Public clouds 175 may be connected to the servers 195 over a public network 170. Private clouds 175 may include private servers 195 that are physically maintained by clients 165 or owners of clients 165. Private clouds 175 may be connected to the servers 195 over a private network 170. Hybrid clouds 175 may include both the private and public networks 170A, 170B and servers 195.

The cloud 175 may include back end platforms, e.g., servers 195, storage, server farms or data centers. For example, the cloud 175 can include or correspond to a server 195 or system remote from one or more clients 165 to provide third party control over a pool of shared services and resources. The computing environment 160 can provide resource pooling to serve multiple users via clients 165 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In embodiments, the computing environment 160 can provide on-demand self-service to unilaterally provision computing capabilities (e.g., server time, network storage) across a network for multiple clients 165. The computing environment 160 can provide an elasticity to dynamically scale out or scale in responsive to different demands from one or more clients 165. In some embodiments, the computing environment 160 can include or provide monitoring services to monitor, control and/or generate reports corresponding to the provided shared services and resources.

In some embodiments, the computing environment 160 can include and provide different types of cloud computing services. For example, the computing environment 160 can include Infrastructure as a service (IaaS). The computing environment 160 can include Platform as a service (PaaS). The computing environment 160 can include server-less computing. The computing environment 160 can include Software as a service (SaaS). For example, the cloud 175 may also include a cloud based delivery, e.g. Software as a Service (SaaS) 180, Platform as a Service (PaaS) 185, and Infrastructure as a Service (IaaS) 190. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Clients 165 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 165 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 165 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, California). Clients 165 may also access SaaS resources through smartphone or tablet applications, including, e.g., Salesforce Sales Cloud, or Google Drive app. Clients 165 may also access SaaS resources through the client operating system, including, e.g., Windows file system for DROP-BOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

B. Appliance Architecture

Figure 2:
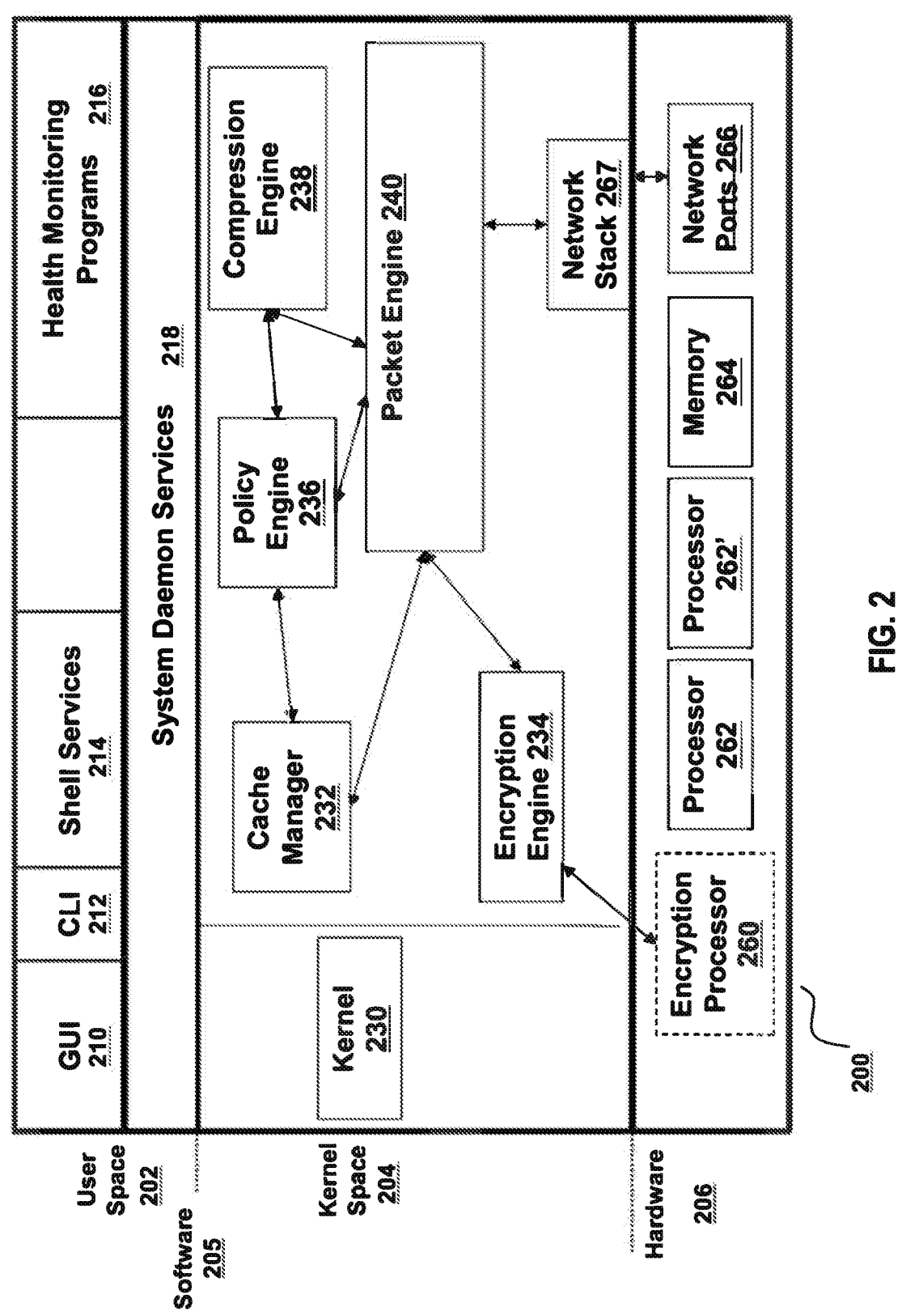
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application 104. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer 243 for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reducing the access time of the data. In some embodiments, the cache memory may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include the programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine if a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layer connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, FL. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

Additional details of the implementation and operation of appliance 200 may be as described in U.S. Pat. No. 9,538, 345, issued Jan. 3, 2017 to Citrix Systems, Inc. of Fort Lauderdale, FL, the teachings of which are hereby incorporated herein by reference.

C. Hostname-Based Split Tunneling

An SSL VPN technology can work with IP packets whose communication can be managed using rules for implementing split tunnel networking based on IP addresses of the network packets. For example, split tunnel networking can be implemented using IP addresses of the data packets to identify those data packets to exclude from the tunnel. However, as network service providers are increasingly relying on cloud-based software as a service (SAAS) products to implement their software and network functionality, the split tunnel network trafficking tools may be aware of only their products' domain names, sometimes not knowing, nor being able to control, IP addresses of the SAAS services. In the meantime, as SAAS products rely on hostnames for their operation, the SAAS products can often change their IP addresses, sometimes without any warning, which can adversely affect the split tunnel network traffic applications relying on the IP addresses for their decision making. In such instances, IP address based rules for split tunnel networking can fail to exclude from tunneling the network traffic when a SAAS product on which the network communication relies changes its IP address.

The present solution addresses these and other issues by providing a solution that relies on the hostnames of the SAAS/cloud-based products/services for split tunneling implementation. As most of the SAAS products use domain and subdomain names for their servers, the solution to these issues should support not just plain domain name rules but also wildcard domain names, as well. The present solution can provide a SSL VPN's client-side solution that can include two parts: a kernel-based driver (e.g., operating in kernel mode/space of the operating system) which can work with raw IP packets in high-throughput mode and a user mode program (e.g., operating in user mode/space of the operating system) which can process (e.g., encapsulate and encrypt) packets and send them to the gateway server. The client solution can also notify the operating system with IP based rules to direct traffic intended for tunneling. The present solution can allow for the driver to avoid tunneling (e.g., sending via SSL VPN tunnel) the traffic that is not necessary to tunnel, and the remote user's system can in turn enjoy the improved network speed on the network traffic that does not need to be slowed down due to unnecessary packet processing (e.g., cryptographic operations for tunneling). The present solution allows for tunneling and/or reverse tunneling based on customer configured IP based split tunnel reverse rules as well as hostname-based rules as well. The present solution can perform a DNS name lookup to get a list of IP addresses for a hostname as well as a wildcard hostname where exact domain names are unknown.

The present solution can provide a reverse-split tunnel solution in which whatever network traffic is specified, can be kept outside of the tunneling, while the rest of the network traffic is processed (e.g., tunneled) inside of the of the VPN network. Host names or service names can be used to specify the traffic. For instance, video conference traffic such as Microsoft Teams™ traffic can be kept outside the VPN as it includes a lot of network traffic that may not be sensitive, while email traffic, such as Microsoft Outlook™, may be tunneled.

Referring now to FIG. 3, at a high level, FIG. 3 depicts an embodiment of a system 300 in which one or more clients 102 exchange a communication with one or more VPN servers 195, over a tunnel 340. The one or more clients 102 can also communicate with an application server 350 and a DNS server 345 over a network 104. The client 102 can include an application 305, an operating system 115, a packet engine 240, a rules engine 334, a driver 330 an agent 120, a split tunnel manager 320 and a database 325. The database 325 can store IP addresses 310, spoof IP addresses 315, hostname 355 and network packets 360.

At a high level, FIG. 3 relates to an example in which an application 305 on a client 102 seeks to communicate with, or utilize/access, other applications (e.g., 305) that can operate on other network devices such as application servers 350, over a network 104. This communication however may be not a sensitive communication, which can therefore be communicated external to the tunnel 340. To implement such split tunnel functionality, the agent 120 and driver 330 of the client 102, along with the split tunnel manager 320, rules engine 335 and/or the information stored in the database 325, can implement split tunneling using the hostname information 355 along with real IP addresses 310 and spoofed IP addresses 315.

A client 102 can include any user device, such as a laptop, a tablet or a smartphone handling at least in part some of the sensitive network traffic, such as enterprise confidential information, emails, documents or other communications. Client 102 can include hardware, software, a combination of hardware and software, instructions or a computer code stored in memory and implemented in one or more processors to provide the functionality of the client 102. A client 102 can include the functionality to communicate with VPN server(s) 195 that can provide cloud-based functionality or services, including SAAS products or services. Client 102 can include a user mode VPN client. The client 102 can communicate with a DNS server 345 to resolve DNS requests, such as DNS requests for accessing particular secure or sensitive services, such as enterprise emails, or non-secure or non-sensitive services, such as for example, streaming video or news services. Client 102 can further communicate with application servers 350, such as for example servers that provide various applications, such as applications 305, to the client 102, including for example online game applications, video streaming applications, news applications and similar. Client 102, application servers 350, DNS servers 345 and VPN servers 195 can exchange network traffic that can include many network packets 360 that can include IP addresses, including real IP addresses 310 or spoof IP addresses 315.

DNS server 345 can include any domain name server or a functionality on a network 104. DNS server 345 can receive a uniform resource locator (URL) from a client 102 and provide the domain name received into a numeric IP address to which the domain name corresponds. DNS server 345 can provide a real IP address of a domain name, which then driver 330 or agent 120 can translate into its corresponding spoof IP address 315 for the application 305.

Application server 350 can include any server on a network 104 providing application services or products to a client 102. Application server 350 can include a video streaming application service, a news service, a video gaming service, a video-conferencing service or any other type of service or product provided by a server or a computing device on a network 104 which client 102 can access, communicate with and use. A client 102 can access application server 350 via a network 104 or via a dedicated connection, including, for example, tunnel 340, which can be established between client 102 and application server 350.

A network packet 360, also referred to as a data packet 360 or a packet 360, can include any type and form of data packet transmitted over a network 104 or a tunnel 340. A network packet 360 can include a header and a payload. A packet 360 can include a Transmission Control Protocol (TCP) packet. A network packet 360 can include a user datagram protocol (UDP) packet. A network packet 360 can include streaming data packet, such as a real-time streaming protocol (RTSP) data packet. A network packet 360 can include an internet control message protocol (ICMP) packet. A network packet 360 can include a raw IP packet. A network packet can include a combination of UDP, ICMP, raw IP and TCP packets, as well as any other data packets known or used in communication between network devices on a network 104 and/or across a tunnel 340. A packet 360 can include a header and a data section. Packet 360 can include any number of fields, such as four fields, for example, and any data section that can include the payload data of an application, such as application 305. A packet 360 can include (e.g., carry or indicate) an IP address, such as a real IP address 310 or a spoofed IP address 360.

Real IP address 310 can include any identifier or an IP address identifying a network device, such as a client 102, VPN server 195 or an application operating on the client 102 or a VPN server 195, such as application 305. Real IP address 310 can be included in a network packet 360, and can include an authentic, global and/or unique identifier generated/assigned by a network device or an application. Real IP address 310 can uniquely identify a particular application, a virtual engine, a service or a product or any other unique entity communicating over a network 104, such as clients 102, VPN servers 195, DNS servers 345 or application servers 350.

Spoofed IP address 315 can include any identifier or an IP address used by an application 305 that is managed by a driver 330 or agent 120 on a client 102 to identify a service, a product, an application or a network device on a network 104. Spoofed IP address 315 can be used or inserted into a data packet 360 instead of the real IP address 310, or vice versa. Spoofed IP address 315 can be an IP address generated/assigned by a client agent 120 or a driver 330. Spoofed IP address 315 can be uniquely mapped to a particular real IP address 310, such that all network traffic incoming to client 102 from a remote device, application or an entity that includes a real IP address 310 can be modified to include a spoofed IP address 315 instead of the real IP address 310. Similarly, spoofed IP address 315 can be replaced by its corresponding real IP address 310 when network traffic is being dispatched to a remote application, device or an entity over the network 104.

Hostname 355 can include any information on a hostname of a service or product on a network 104. Hostname 355 can include information such as a uniform resource locator (URL) and a domain name, including a fully qualified domain name (FQDN) and/or any label that is assigned to a device connected to a computer network, such as network 104.

A tunnel 340 can include a secured connection from a client 102 to a particular one or more devices, such as VPN servers 195. A tunnel 340 can include a protocol that allows for secure movement of data from one network to another. A tunnel 340 can include a secured communication established via a network 104. A tunnel 340 can include a secured communication between the client device 102 and one or more VPN servers 195 either directly or through a network 104. Tunnel 340 can include a direct communication without any intervening or intermediary devices, or a communication via one or more intervening or intermediary devices. A tunnel 340 can include an IPsec tunnel, a dynamic multipoint VPN or aMPLS-based L3VPN. A tunnel 340 can be used to transmit network packets 360 from the client 102 device to the one or more VPN servers 195.

An application 305 on a client 102 can generate, send and/or receive network packets 360 over tunnel 340 or network 104. Application 305 can include hardware, software, a combination of hardware and software, instructions or a computer code stored in memory and implemented in one or more processors to provide the functionality of the application 305. Application 305 can include the functionality to communicate with other applications 305 on other network devices, such as DNS server 345 and application server 350 over the network 104. Application 305 can use, send and/or receive any network traffic, including for example, TCP/IP traffic or UDP traffic. Application 305 can include, for example, an application 16 or any application discussed herein. Application 305 can include, for example, a streaming audio or video application, a secure shell application, a remote desktop application, an email application or any other application that can utilize or generate network traffic. Client 102 can run any number of applications 305, or can receive network data, such as data packets 360 having IP addresses 310 or 315, from any number of applications 305 on any number of network devices, such as VPN servers 195, over a network 104.

Operating system 115, also referred to as the OS 115, in addition to aforementioned functionality, can further include the functionality to receive, send and process data packets 360. The OS 115 can include the functionality to receive, send, forward or direct data packets 360. OS 115 can include the functionality to run the one or more applications 305 and can handle any data packets 360 communicated to and from applications 305.

Packet engine 240, in addition to aforementioned functionality, can further include the functionality to process packets 360. Packet engine 240 can include hardware or a combination of hardware and software, such as instructions or a computer code stored in memory and implemented in one or more processors to provide the functionality of the packet engine 240. Packet engine 240 can utilize rules engine 335 to process packets 360. Packet engine 240 can include the functionality to swap real IP address 310 in a packet 360 with a spoofed TP address 315, and vice versa to swap a spoofed IP address 315 with a real IP address 310. Packet engine 240 can include the functionality to monitor and process packets 360 to and from application 305 and/or to and from application servers 350 or DNS servers 345. Packet engine 240 can determine whether packets 360 are to be sent to a tunnel 340 or outside of the tunnel 340. Packet engine 240 can encapsulate and/or decapsulate packets 360 with IP addresses, including 310 and/or 315, based on rules of the rules engine 335. Packet engine 240 can read information, including IP addresses 310, 315, packets 360 of database 325, and can utilize the stored information to modify packets 360.

Rules engine 335 can include any hardware, or a combination of hardware and software to implement rules for handling data packets 360. Rules engine 335 can include hardware, or a combination of hardware and software, such as instructions or a computer code stored in memory and implemented in one or more processors, to provide the functionality of the rules engine 335. Rules engine 335 can include the functionality to implement rules on data packets 360. Rules engine 335 can utilize one or more rules set and/or established by the rules engine 335 to monitor packets 360. Rules engine 335 can determine whether packets 360 are to be sent via tunnel 340 or through a connection external to the tunnel 340. Rules engine 335 can include a list of hostname based rules for determining which network traffic to tunnel and which not to tunnel.

Split tunnel manager 320 can include any functionality for managing tunnels 340. Split tunnel manager 320 can include hardware, or a combination of hardware and software, such as instructions or a computer code stored in memory and implemented in one or more processors to provide the functionality of the split tunnel manager 320. Split tunnel manager 320 can include the functionality for establishing tunnels 340. Split tunnel manager 320 can include the functionality to determine which network traffic is going to be tunneled and which network traffic is going to be excluded from tunneling. Split tunnel manager 320 can manage rules in the rules engine 335 to establish which network packets 360 are to be tunneled and which are to be excluded from tunneling.

Database 325 can include any organized collection of structured information or data stored in memory. Database 325 can include a file system and/or tables of information. Database 325 can store any information or metadata on real IP addresses 310, spoofed IP addresses 315 and/or data packets 360. Database 325 can store any information or metadata on applications 305, or devices on a network 140, such as VPN server 195, DNS server 345 or application server 350. Database 325 can include a list of hostname based rules. Database 325 can correspond/map/link hostnames to IP addresses as well as their corresponding spoof IP addresses.

In addition to aforementioned functionality, agent 120 can include any functionality for establishing a tunnel 340 and handling data packet 360 transmitted via tunnel 340. Agent 120 can include hardware, or a combination of hardware and software, such as instructions or a computer code stored in memory and implemented in one or more processors to provide the functionality of the agent 120. Agent 120 can include functionality to configure tunnels 340. Agent 120 can include functionality to implement DNS requests on behalf of applications 305 on a client 102. Agent 120 can include functionality to generate/assign spoof IP addresses for applications 305. Agent 120 can include functionality to identify real IP address 310 and spoofed IP address 315 pairs from database 325. Agent 120 can include a user mode VPN client. Agent 120 can include the functionality to encapsulate and decapsulate packets 360, modify headers of the packets 360, including IP addresses 310 and 315, and/or encrypt packets 360 and their internal components, such as the payload. Agent 120 can include the functionality to establish and manage tunnel 340 with any number of VPN servers 195 of a cloud SAAS or application servers 350 of other providers or enterprises on a network 104.

Driver 330 can include any functionality for monitoring and managing network traffic of applications 305. Driver 330 can include hardware, or a combination of hardware and software, such as instructions or a computer code stored in memory and implemented in one or more processors to provide the functionality of the driver 330. Driver 330 can monitor and manage, for an application 305, any requests to and responses from, a DNS server 345. Driver 330 can monitor and manage, for an application 305, any real IP addresses 310 and/or spoofed IP addresses 315. Driver 330 can receive real or spoofed IP addresses 310/315 from an agent 120 and can use them to modify DNS requests and responses, as necessary. Driver 330 can include one or more tracking entries for tracking network traffic based on their real IP addresses 310 or spoofed IP addresses 315. For example, driver 330 can include a tracking entry of <hostname, real IP, spoofed IP> and can use it to monitor network traffic of a particular application 305 for which network traffic is to be excluded from tunneling. Driver 330 can include a VPN client driver.

The example system illustrated in FIG. 3 can be used for spoofing domain resolution. For example, if a customer configures hostname-based rules (e.g., using a rules engine) to exclude traffic (e.g., packets 360 of particular applications 305) the client 102 can implement multiple actions after receiving such a configuration. For example, a client 102 can set aside multiple IP addresses that are not used, such as for example, a range of about 65,000 IP addresses from a relatively unused range for spoofing. In some implementations, the client 102 sets aside all IP addresses from 172.30.0.0 to 172.30.255.255. Client 102 can then inform the operating system (e.g., OS 115) to tunnel the network traffic that is below or above the set-aside spoofed range of IP addresses. Client 102 can then listen for all the domain resolution requests (e.g., the DNS traffic) from the client. Client 102 can add a routing entry for spoofed IP range which points to real gateway IP address.

Whenever a user tries to access any URL, the operating system (e.g., 115) can resolve that URL's hostname using a DNS request to a DNS server 345. As DNS traffic can be captured by SSL VPN client software, such a DNS request can come to the client 102, including for example the agent 120. Upon receiving any DNS request, client 102 (e.g., agent 120) can resolve the request. However, before sending the correct answer to the operating system (e.g., 115) or the application 305, client 102 (e.g., agent 120) can match the hostname from the DNS request against a list of hostname-based rules. If the given hostname matches an exclusion rule in the rules engine 335, client 102 can send one of the spoofed IP instead of resolved IP addresses to the requesting application 305. Client 102 can for example add a tracking entry of <hostname, real IP, spoofed IP>. Client 102 can also send this tracking entry to a kernel driver (e.g., driver 330) as a control message. The operating system 115 can receive a response for hostname DNS resolution, and can forward it to application 305. Application 305 can then send network traffic (e.g., packets 36*t*0) to the spoofed IP address. Client 102 can inform the operating system 115 to send all spoofed IP traffic to the driver 330 and so this traffic can be received by client's high throughput kernel component (e.g., driver 330 and/or agent 120). The kernel component can check IP packet's destination. If the IP packet's destination falls outside the spoofed IP range, the IP address of that packet can be replaced with real IP addresses and the packet can be directly sent to out of machine. Using this technique, the excluded traffic never goes to user mode process of the client 102 which could otherwise introduce latency to excluded traffic and can slow down the user mode process. Going forward, whenever a traffic from outside the client is received, driver 330 can check whether received traffic's real IP address 310 has a corresponding spoofed IP 315 entry. If it is determined that it does have a corresponding spoofed IP entry, the driver 330 can replace the real IP addresses with spoofed IP address counterparts and sent directly to the operating system 115, so that this processed data packet can be received by application 305 without VPN client's user mode process involvement.

This technique provides several advantages. For example, the traffic excluded from the tunneling can be processed minimally by only high throughput kernel driver without any kind of copy. Therefore, the excluded traffic's latency can be minimal and the user process's CPU usage can be low, while even in heavy excluded traffic scenario, tunneled traffic can be unaffected by the excluded traffic. Moreover, as the client 102 is informing operating system 115 about capture rules during the start of the tunnel, whenever a new hostname is to be excluded from tunneling, client 102 can avoid informing the operating system 115 by stopping traffic processing, further allowing to avoid latency impact of naïve implementation. In addition, the client can add one or more routing entries for spoofed IP range which point to real gateways and so a correct firewall which exists for external traffic can get applied for this traffic, as well.

Referring now to FIG. 4, an example of a flowchart of acts for tunnel establishment is illustrated. In FIG. 4, a component of a client 102 (e.g., agent 120) can include a VPN client (user mode), which can send a get-configuration transmission to a VPN server 195. The get-configuration transmission can include a request to configure a tunnel 340. The VPN server 195 can respond to the client 102 (e.g., agent 120) with a configuration response that can include the exclude/exclusion rules for hostnames. At this point, client 102 (e.g., agent 120) can decide on unused spoofed IP range to use for this particular implementation of the tunnel 340. Client 102 (e.g., agent 120) can then send to an operating system 115 an add routing entry on real adapter for spoofed IP range. Client 102 (e.g., agent 120) can also ask the OS 115 to divert DNS traffic as well as traffic with addresses within the spoofed IP range, to driver 330. Client 102 (e.g., agent 120) can send to the driver 330 a transmission to inform the driver 330 of the spoofed IP range. Based on these interactions, the tunnel 340 can be established.

Referring now to FIG. 5, an example of a flowchart of acts for hostname resolution is illustrated. In FIG. 5, an application 305 can try to resolve a DNS for a remote application on a network 104 that the application is trying to access. The application 305 can send a transmission to the operating system 115, which can include a request to complete a DNS resolution of an excluded hostname. For example, the transmission to OS 115 can include a request to resolve tl.excluded-domain.com. The operating system 115 can then forward the received request in accordance with the DNS rules to the driver 330. Driver 330 can also forward the request in accordance with the DNS rules to the agent 120. Agent 110 can then resolve the domain, check if the domain matches the exclusion list (e.g., via rules engine 335) and to the extent a match is found, agent 120 can continue as follows.

First, agent 120 can get a new spoofed IP address. Agent 120 can then add a hostname, spoofed IP and real IP entry into a list or a memory, such as a database 325. Agent 120 can then send to driver 330 a control packet to create the hostname, spoofed IP and real IP entries. Driver 330 can then create such an entry for the hostname, spoofed IP and the real IP so that they can be related, or corresponding, to each other. Agent 120 can modify a DNS response with a spoofed IP address and can send the modified response to driver 330. Driver 330 can then forward the DNS response with the spoofed IP address to the operating system 115, which can then forward the same spoofed DNS response to the application 305. The application 305 can then be led to refer to the requested remote application for which the DNS was resolved using a spoofed IP address for any future communications by the application 305 with that remote application.

Referring now to FIG. 6, an example of a flowchart of acts for packet processing for outgoing network traffic is illustrated. In FIG. 6, an application 305 can send a packet 360 with spoofed IP address 315 to the operating system 115. The operating system 115 can forward the received packet 360 to the driver 330, per traffic rules. Driver 330 can then check whether a destination IP address in the received packet is spoofed IP 315. Driver 330 can make this determination using rules engine 335 to identify a listed range of spoofed IP addresses. If driver 330 determines that the destination IP address from the packet 360 is indeed a spoofed IP address 315, driver 330 can replace the spoofed IP address 315 with its corresponding (e.g., matching) real IP address 310 and then upon inserting the real IP address 310 into the packet 360, driver 330 can send the packet 360 over the network 104 (and bypassing the tunnel) to the intended destination (e.g., destination application 305 on a network device, such as an application server 350).

Referring now to FIG. 7, an example of a flowchart of acts for packet processing for incoming network traffic is illustrated. In FIG. 7, the operating system 115 can forward an incoming data packet 360 to a driver 330 in accordance with the traffic rules. Driver 330 can check whether a destination IP address in the received packet 360 is a real IP address 310 that corresponds to one of the spoofed IP addresses 315. If driver 330 determines that the destination IP address in the packet 360 is a real IP address 310 that corresponds to a spoofed IP address 315, driver 330 can modify the packet 360 to insert the spoofed IP address 315 instead of the real IP address 310 and can send the modified packet 360 to the operating system 115. The operating system 115 can then send or forward the received modified packet 360 to the application 305, which can receive the packet 360 with the spoofed IP address 315.

For example, the present solution can relate to a device. The device can include at least one processor (e.g., 103) that can be configured to execute a driver 330. The configuration for the driver 330 can include instructions executed on the one or more processors (e.g., 103) to perform one or more acts or functionalities of the driver 330. The driver 330 can receive a first packet (e.g., 360) of an application (e.g., 305). The packet 360 can include or identify a hostname (e.g., 355) of a destination. The destination can be the destination network device or an application to which the packet 360 is sent. The driver 330 can receive, from an agent 120, such as a VPN client (in user mode), a real IP address 310 and a spoofed IP address 315 corresponding to the hostname 355. Driver 330 can receive this when the hostname 355 matches one of a plurality of hostnames 355 to exclude packet traffic (e.g., 360) from a virtual private network (VPN) tunnel (e.g., 340) of the agent 120. The spoofed IP address 315 may be used to exclude/prevent/manage/redirect traffic to be communicated with certain pre-specified destination(s), from being communicated via/in a VPN tunnel of the VPN client.

The driver 330 can receive the real IP address 310 and/or a spoofed IP address 315 in a control packet to create/establish/maintain a defined entry, such as a <hostname, spoofed IP, real IP> entry. The driver 330 can receive, from the agent 120, a domain name service (DNS) response that includes the spoofed IP address 315. The DNS response can be responsive to a DNS request from an application 305 on the client 102. The driver 330 can send the DNS response to the application 305 to cause the application 305 to include the spoofed IP address 315 in a second packet (e.g., 360) and/or subsequent packets for the destination (e.g., destination network device, such as application server 350).

The device can include the agent 120, driver 330 and application 305 operating as executables, or executing on, the device, such as a client 102. The device (e.g., client 102) can include at least one processor (e.g., 103) is configured to execute the driver 330 to receive, from the application 305 via an operating system 115, the second packet 360 that includes the spoofed IP address. The at least one processor can be configured to update/modify the second packet (e.g., 360) by replacing the spoofed IP address 315 with the real IP address 310.

The device can include the at least one processor that is configured to execute the driver 330 to send the updated second packet (e.g., 360) to the destination (e.g., 195, 350) by bypassing/avoiding (or not using) the VPN tunnel 340 of the agent 120. The device can include at least one processor that is configured to execute the driver 330 to receive, from an operating system 115, a third packet (e.g., 360) that includes the real IP address 310 and can update the third packet by replacing the real IP address 310 with the spoofed IP address 315.

The device can include the at least one processor (e.g., 103) that is configured to execute the driver 330 to send the updated third packet to the application via the operating system. The driver 330 can receive, from the application 305 via an operating system 115, a third packet (e.g., 360) that includes second hostname 355 of a second destination. Driver 330 can receive, from the agent 120, a second DNS response that includes a second real IP address 310 corresponding to the second hostname 355, when the second hostname 355 fails to match any of the plurality of hostnames 355. Driver can also send the second DNS response to cause the application to include the second real IP address corresponding to the second hostname 355, in a fourth packet (e.g., 360), e.g., that is to be communicated via/using the VPN tunnel.

The device (e.g., client 102) can include the at least one processor that is configured to execute driver 330 to receive, from the application (e.g., 305) via the operating system (e.g., 115), the fourth packet (e.g., 360) that includes the second real IP address 310. Driver 330 can determine that the second real IP address 310 does not correspond to any spoofed IP address 315 and can send, responsive to the determination, the fourth packet to the agent 120 to send to the second destination (e.g., 350, 195) via the VPN tunnel 340, provided that the tunnel 340 is established with the destination. Device 330 can receive, from the agent 120, an indication of spoofed IP addresses. The indication can include a range of spoofed IP addresses to choose from for implementing the split tunneling solution. The agent 120 can configure an operating system to direct packets (e.g., 360) with any of the spoofed IP addresses 315 to the driver 330.

The present solution can relate to a non-transitory computer-readable medium storing instructions that, when executed by at least one processor (e.g., 103) of a service, cause the at least one processor to implement a plurality of acts or functionalities. The at least one processor (e.g., 103) can receive a first packet 360 of an application 305 that includes a hostname 355 of a destination (e.g., an application server), such as a destination to which the first packet 360 is directed. The at least one processor (e.g., 103) can receive, from an agent 120 (e.g., VPN client, in user mode), a real IP address 310 and a spoofed IP address 315 corresponding to the hostname 355, when the hostname 355 matches one of a plurality of hostnames to exclude packet traffic from a virtual private network (VPN) tunnel of the agent. The at least one processor (e.g., 103) can receive from the agent 120 a control packet to create an entry to relate/store the spoofed IP address and the real IP address, such as a <hostname, spoofed IP, real IP> entry. The at least one processor (e.g., 103) can receive, from the agent 120, a domain name service (DNS) response that includes the spoofed IP address 315 and can send the DNS response to the application 305 to cause the application 305 to include/ use/reference the spoofed IP address 315 in a second packet (e.g., 360) for the destination.

In some implementations, the non-transitory computer-readable medium can store the instruction which, when executed by the at least one processor (e.g., 103) of a service, can cause the at least one processor (e.g., 103) to receive, from the application 305 via an operating system 115, the second packet 360 that includes the spoofed IP address 315. The at least one processor 103 can also update (e.g., modify) the second packet 360 by replacing the spoofed IP address 315 with the real IP address 310, and can send the updated second packet 360 to the destination by bypassing/skipping the VPN tunnel 340 of the agent 120.

In one aspect, the present solution relates to a method 800 of managing network hostname based split tunneling of network traffic of a client 102. The present solution can include a series of acts, such as acts 805-830 of the method 800 that can provide for establishing and implementing hostname-based split tunneling from a client 102 device. Act 805 can include receiving a packet of an application. At act 810, a real IP address and a spoofed IP address can be received. At act 815, a DNS transmission with a spoofed IP address can be received. At act 820, the DNS transmission with spoofed IP address can be sent to the application. At act, 825, a packet with a spoofed IP address can be updated. At act 830, a packet with a real address can be updated.

Act 805 can include receiving a packet of an application. The application can include an application communicating with an application executing on a remote server, such as an application server. The packet can include a data packet that includes an IP address of a destination. The IP address can include a real IP address. The IP address can include a spoofed IP address. A driver can include a VPN client driver (e.g., operating in kernel mode/space). The driver can receive a first packet of an application that includes a hostname of a destination (e.g., an application server). The hostname can correspond to a cloud-based service or a product on a remote application server. The driver, the application and the agent can be executable on the same client device.

At act 810, a real IP address and a spoofed IP address can be received. The driver, such as a driver on a client device, can receive, from an agent of the client device, the spoofed IP address and the real IP address. The agent can include a VPN client (e.g., operating in user mode/space). The received real IP address and the spoofed IP address can correspond to (e.g., be assigned to) a (same) hostname. The agent can send to the driver the spoofed IP address and the real IP address along with the hostname, in response to determining that the real IP address and the spoofed IP address correspond to the hostname. The driver can receive the real IP address and the spoofed IP address from the agent when the hostname matches one of a plurality of hostnames to exclude packet traffic from a virtual private network (VPN) tunnel of the agent. The VPN tunnel can be established between the client device and one or more remote VPN servers or one or more remote application servers.

At act 815, a DNS transmission/response with a spoofed IP address can be received. The driver can receive, from the agent, a domain name service (DNS) response that includes the spoofed IP address. The DNS response can include a response to a DNS request previously sent by an application operating on the client 102. The agent and/or driver can intercept the DNS request and listen to the DNS response. Once a DNS response is received, the agent and/or driver can determine if/whether the DNS response includes a hostname of a service or a product for which network communication is to be excluded from the tunneling.

At act 820, the DNS transmission with spoofed IP address can be sent to the application. The driver can send the DNS response to cause the application to include the spoofed IP address in a second packet for the destination. The driver can include the spoofed IP address in response to determining that the hostname of the DNS response corresponds to one or more hostnames whose network traffic is to be excluded from tunneling. Driver can include/incorporate/insert the spoofed IP address into the DNS response to the application in response to matching the hostname of the DNS response with a hostname in the list of hostnames for whom to exclude the network traffic from the VPN processing/tunnel. Driver can match the hostname of the DNS response based on a rule of a rules engine matching the hostname of the DNS response with the hostname in the rule.

At act, 825, a packet with a spoofed IP address can be updated. A packet with a spoofed IP address can be received from an application executing on the client. The application can send a packet to an application on a remote device, such as a remote application server or a remote VPN server. The driver can receive, from the application via an operating system, the packet, or a second packet that includes the spoofed IP address. The driver can update the packet or the second packet by replacing the spoofed IP address with the real IP address, and can send the updated packet or the updated second packet to the destination by bypassing (e.g., without using) the VPN tunnel of the agent. The driver can receive from the agent an indication of spoofed IP addresses, such as an indication of an IP address change. The agent can configure the operating system to direct packets with any of the spoofed IP addresses to the driver.

At act 830, a packet with a real address can be updated. The driver can receive from an operating system a packet, or a third packet, that includes the real IP address. The driver can update the packet or the third packet by replacing the real IP address with the spoofed IP address. The driver can send the updated packet or the updated third packet to the application via the operating system. The driver can receive, from the application via an operating system, the packet or the third packet that includes second hostname of a second destination. The driver can receive, from the agent, a second DNS response that includes a second real IP address corresponding to the second hostname, when the second hostname fails to match any of the plurality of hostnames for which traffic is to be excluded from VPN tunneling. The driver can send the second DNS response to cause the application to include the second real IP address corresponding to the second hostname, in a fourth packet. The driver can receive, from the application via the operating system, the fourth packet that includes the second real IP address. The driver can determine that the second real IP address does not correspond to any spoofed IP address, and/or that the fourth packet can be communicated via the VPN tunnel. The driver can determine that the second real IP address does not correspond to any spoofed IP addresses, in response to determining that the second real IP address is outside of a range of spoofed IP addresses. The driver can send, responsive to the determination, the fourth packet to the agent to send to the second destination via the VPN tunnel.

Various elements, which are described herein in the context of one or more embodiments, may be provided separately or in any suitable sub-combination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C #, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

We claim:

1. A method comprising:
receiving, by a driver, a first packet of an application that includes a hostname of a destination;
receiving, by the driver from an agent, a real IP address and a spoofed IP address corresponding to the hostname, when the hostname matches one of a plurality of hostnames to exclude packet traffic from a virtual private network (VPN) tunnel of the agent;
receiving, by the driver from the agent, a domain name service (DNS) response that includes the spoofed IP address;
sending, by the driver, the DNS response to cause the application to include the spoofed IP address in a second packet for the destination;
receiving, by the driver from the application via an operating system, a third packet that includes second hostname of a second destination; and
receiving, by the driver from the agent, a second DNS response that includes a second real IP address corresponding to the second hostname, when the second hostname fails to match any of the plurality of hostnames; and
sending, by the driver, the second DNS response to cause the application to include the second real IP address corresponding to the second hostname, in a fourth packet.

2. The method of claim 1, wherein the agent, the driver and the application are executable on a same client device.

3. The method of claim 1, comprising:
receiving, by the driver from the application via an operating system, the second packet that includes the spoofed IP address; and
updating, by the driver, the second packet by replacing the spoofed IP address with the real IP address.

4. The method of claim 3, comprising:
sending, by the driver, the updated second packet to the destination by bypassing the VPN tunnel of the agent.

5. The method of claim 1, comprising:
receiving, by the driver from an operating system, a third packet that includes the real IP address; and
updating, by the driver, the third packet by replacing the real IP address with the spoofed IP address.

6. The method of claim 5, comprising:
sending, by the driver, the updated third packet to the application via the operating system.

7. The method of claim 1, comprising:
receiving, by the driver from the application via the operating system, the fourth packet that includes the second real IP address;
determining, by the driver, that the second real IP address does not correspond to any spoofed IP address; and
sending, by the driver responsive to the determination, the fourth packet to the agent to send to the second destination via the VPN tunnel.

8. The method of claim 1, comprising:
receiving, by the driver from the agent, an indication of spoofed IP addresses, wherein the agent configures an operating system to direct packets with any of the spoofed IP addresses to the driver.

9. A device comprising:
at least one processor configured to execute a driver to:
receive a first packet of an application that includes a hostname of a destination;
receive, from an agent, a real IP address and a spoofed IP address corresponding to the hostname, when the hostname matches one of a plurality of hostnames to exclude packet traffic from a virtual private network (VPN) tunnel of the agent;

receive, from the agent, a domain name service (DNS) response that includes the spoofed IP address;

send the DNS response to the application to cause the application to include the spoofed IP address in a second packet for the destination;

receive, from the application via an operating system, a third packet that includes second hostname of a second destination; and receive, from the agent, a second DNS response that includes a second real IP address corresponding to the second hostname, when the second hostname fails to match any of the plurality of hostnames; and send the second DNS response to cause the application to include the second real IP address corresponding to the second hostname, in a fourth packet.

10. The device of claim 9, wherein the agent, the driver and the application are executable on the device.

11. The device of claim 9, wherein the at least one processor is configured to execute the driver to:

receive, from the application via an operating system, the second packet that includes the spoofed IP address; and update the second packet by replacing the spoofed IP address with the real IP address.

12. The device of claim 11, wherein the at least one processor is configured to execute the driver to:

send the updated second packet to the destination by bypassing the VPN tunnel of the agent.

13. The device of claim 9, wherein the at least one processor is configured to execute the driver to:

receive, from an operating system, a third packet that includes the real IP address; and update the third packet by replacing the real IP address with the spoofed IP address.

14. The device of claim 13, wherein the at least one processor is configured to execute the driver to:

send the updated third packet to the application via the operating system.

15. The device of claim 9, wherein the at least one processor is configured to execute the driver to:

receive, from the application via the operating system, the fourth packet that includes the second real IP address;

determine that the second real IP address does not correspond to any spoofed IP address; and send, responsive to the determination, the fourth packet to the agent to send to the second destination via the VPN tunnel.

16. The device of claim 9, wherein the at least one processor is configured to execute the driver to:

receive, from the agent, an indication of spoofed IP addresses, wherein the agent configures an operating system to direct packets with any of the spoofed IP addresses to the driver.

17. A non-transitory computer-readable medium storing instructions that, when executed by at least one processor of a service, cause the at least one processor to:

receive a first packet of an application that includes a hostname of a destination;

receive, from an agent, a real IP address and a spoofed IP address corresponding to the hostname, when the hostname matches one of a plurality of hostnames to exclude packet traffic from a virtual private network (VPN) tunnel of the agent;

receive, from the agent, a domain name service (DNS) response that includes the spoofed IP address;

send the DNS response to the application to cause the application to include the spoofed IP address in a second packet for the destination;

receive, from the application via an operating system, a third packet that includes second hostname of a second destination; and receive, from the agent, a second DNS response that includes a second real IP address corresponding to the second hostname, when the second hostname fails to match any of the plurality of hostnames; and send the second DNS response to cause the application to include the second real IP address corresponding to the second hostname, in a fourth packet.

18. The non-transitory computer-readable medium of claim 17, wherein the instructions, when executed by the at least one processor of a service, cause the at least one processor to:

receive, from the application via an operating system, the second packet that includes the spoofed IP address;

update the second packet by replacing the spoofed IP address with the real IP address; and send the updated second packet to the destination by bypassing the VPN tunnel of the agent.

* * * * *